United States Patent [19]

Scobee

[11] Patent Number: 5,353,339
[45] Date of Patent: Oct. 4, 1994

[54] SIMPLIFIED UNIFORM NETWORK PROVISIONING AND RESTORATION

[75] Inventor: John D. Scobee, St. Louis, Mo.

[73] Assignee: AT&T Bell Laboratories, Murray Hill, N.J.

[21] Appl. No.: 886,570

[22] Filed: May 20, 1992

[51] Int. Cl.$^5$ .............................................. H04M 3/42
[52] U.S. Cl. .................................. 379/207; 379/201; 379/221
[58] Field of Search ............... 379/221, 207, 196, 201, 379/220

[56] References Cited

U.S. PATENT DOCUMENTS

| | | | |
|---|---|---|---|
| 3,997,731 | 12/1976 | Wilmot et al. | 379/201 |
| 4,163,124 | 7/1979 | Jolissaint | 379/220 |
| 4,931,941 | 6/1990 | Krishnan | 364/437 |
| 4,991,204 | 2/1991 | Yamamoto et al. | 379/221 |
| 5,065,392 | 11/1991 | Sibbitt et al. | 370/58.2 |
| 5,065,393 | 11/1991 | Sibbitt et al. | 370/58.2 |

OTHER PUBLICATIONS

Gopal et al., "Routing in a Circuit-Switched Network with Priority Classes", Sep. 1989, IEEE, pp. 792–799.

*Primary Examiner*—James L. Dwyer
*Assistant Examiner*—Ahmad F. Matar
*Attorney, Agent, or Firm*—Eugene J. Rosenthal; Ronald D. Slusky

[57] ABSTRACT

A unified and automated system for providing, restoring and optimizing special services is continually aware of the state of all the equipment and facilities in the network. The unified system responds automatically to a request for a special service by 1) designing a circuit required to support the requested special service, 2) identifying network facilities and configurations for implementing the designed circuit, 3) assigning those facilities to the circuit, 4) causing the various equipment providing the facilities to be interconnected to implement the service, 5) verifying the integrity of the special service, and 6) delivering the service to the customer. In accordance with an aspect of the invention, if at any point in the process of providing a special service it is determined that there are no available direct transport facilities in the inventory of network facilities at the level required to provide the special service between the particular points in the network that must be interconnected to provide the special service, the system will employ procedures for further identifying or developing transport facilities, in accordance with a predetermined hierarchical plan. The identified or developed transport facilities are delivered, as a unit, as a new inventory facility at the required level. In accordance with an aspect of the invention, if an indirect connection is used at any level, the new inventory unit is marked as a candidate for optimization to be performed in the future. Thereafter the process of providing the special service can proceed as previously described.

27 Claims, 12 Drawing Sheets

| FIG.7 | FIG.10 |
|-------|--------|
| FIG.8 | FIG.11 |
| FIG.9 | FIG.12 |

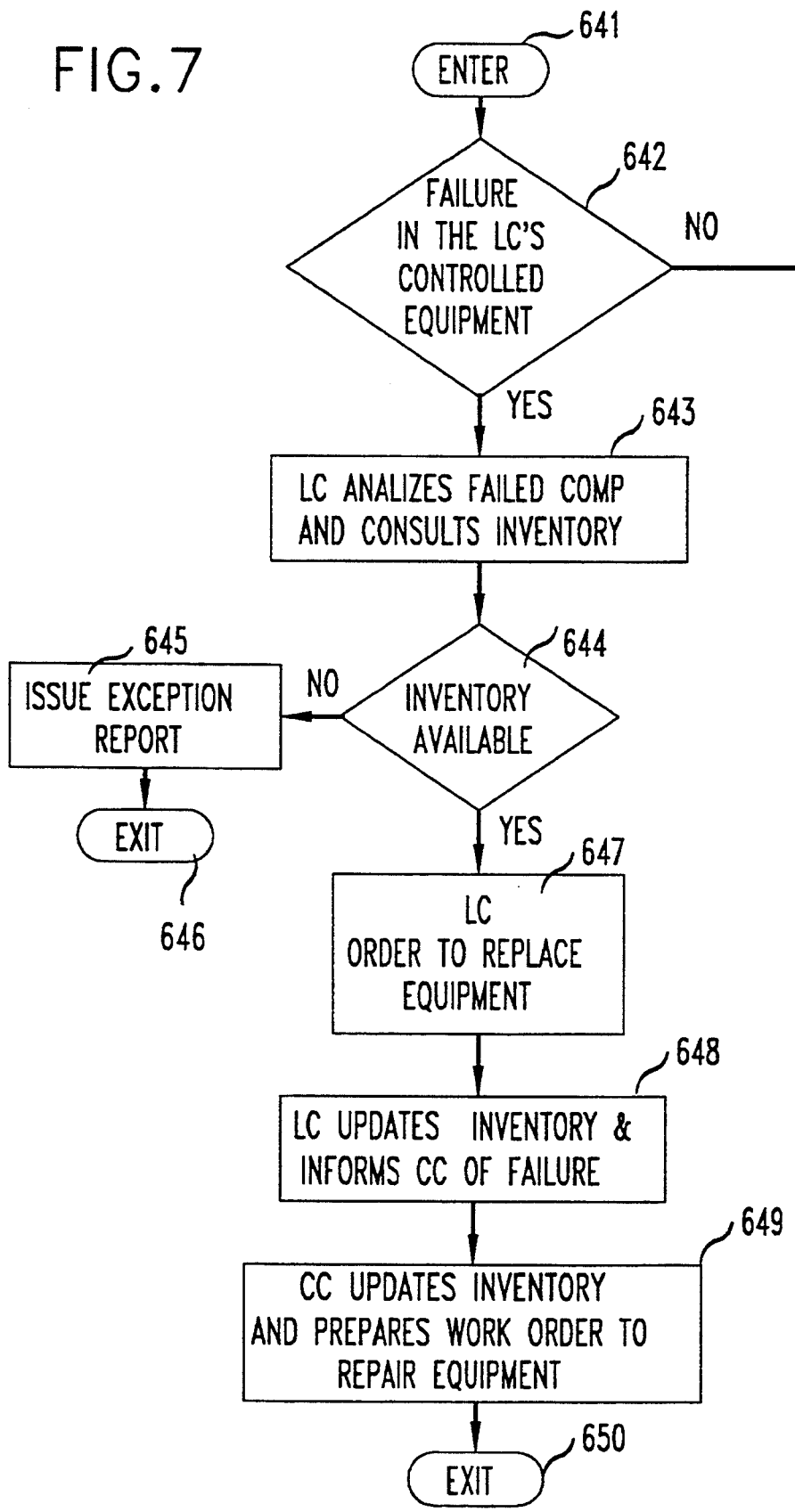

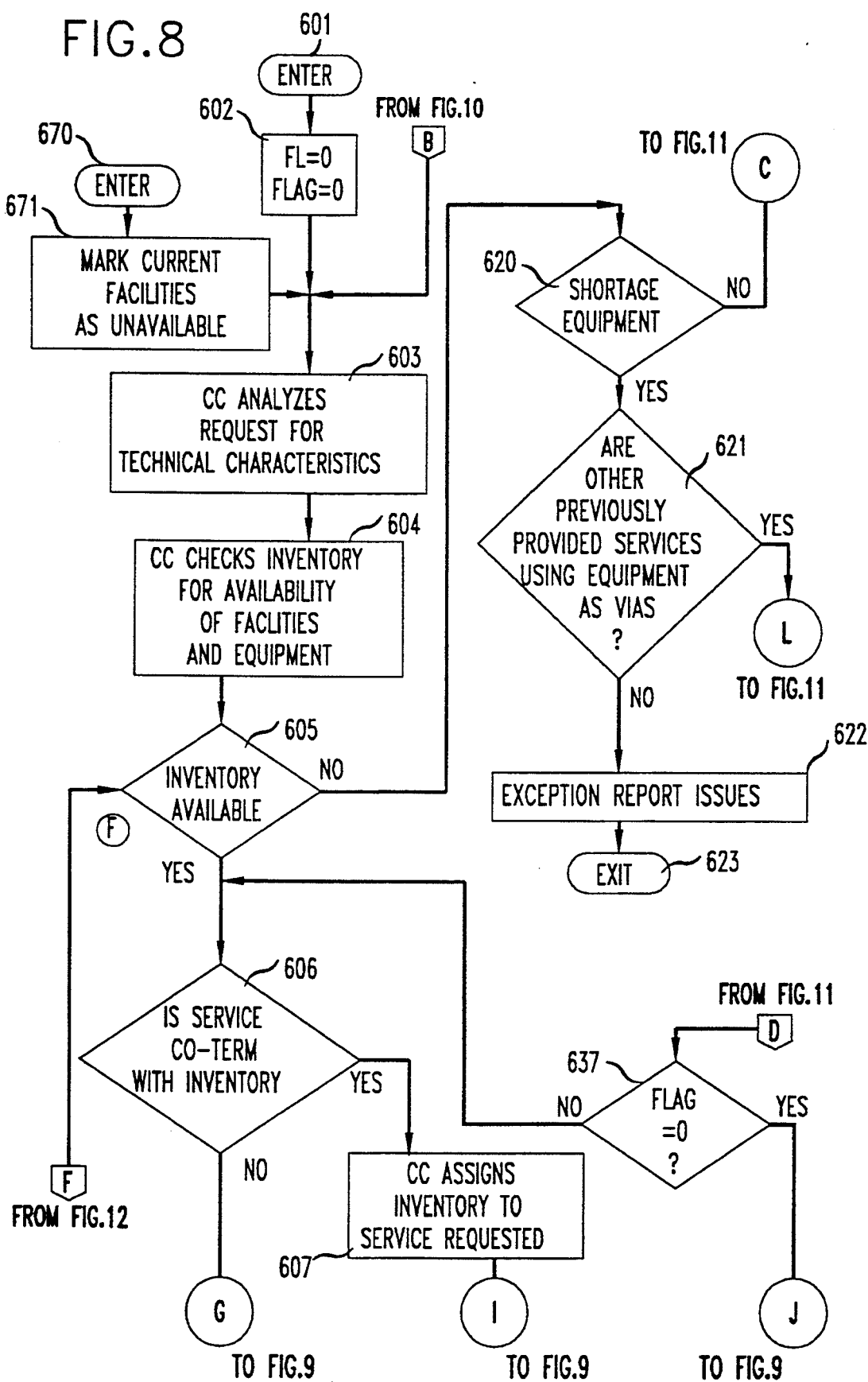

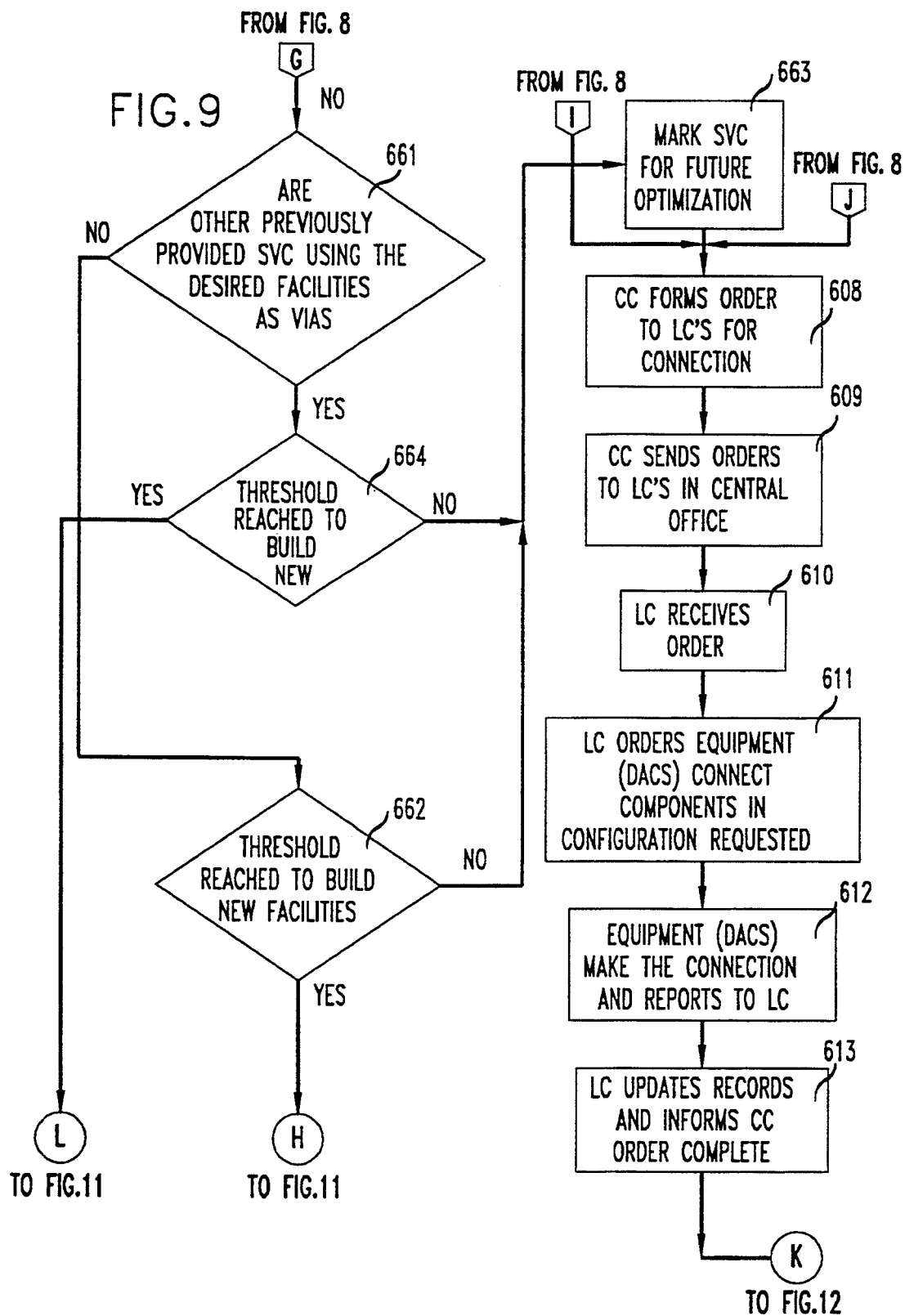

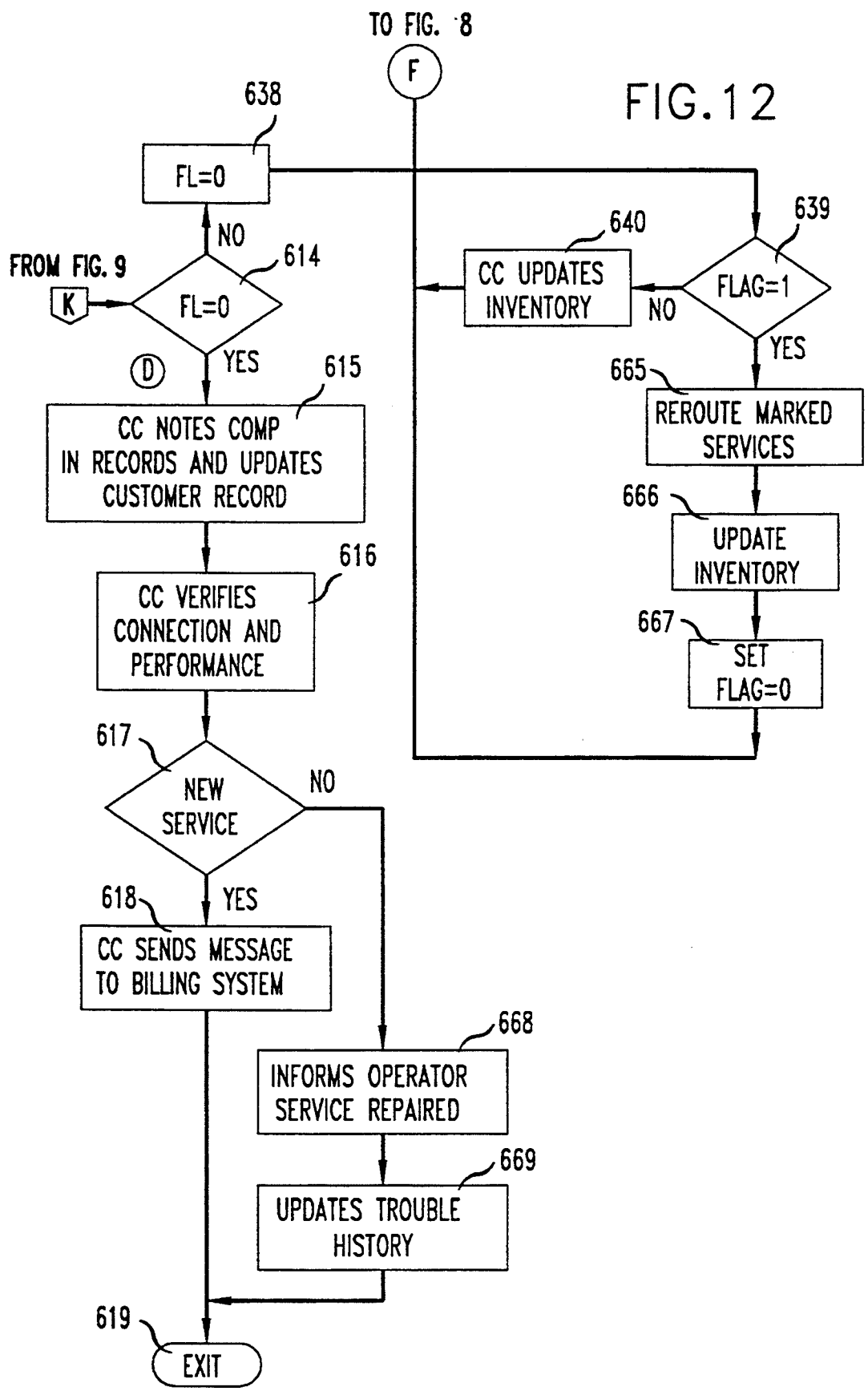

SIMPLIFIED UNIFORM NETWORK PROVISIONING AND RESTORATION

TECHNICAL FIELD

This invention relates to providing voice and data network services to a customer, and more particularly, customer-specified special services.

BACKGROUND OF THE INVENTION

As used herein, the term "special service" is a dedicated communication capability provided through a network for the exclusive use of a specific customer. The special service may be any one of a large set of possible electronic communications services. The types of communication services which may belong to the set are well known and include: 1) ordinary point-to-point voice communications services, 2) ordinary point-to-point data services (e.g., 4.8 kbit/sec), 3) facsimile services, and 4) high speed (e.g., 45 Mbit/sec) data special services. The characteristics of a special service are determined by the equipment that is employed in a special service circuit that provides the special service. Equipment used for providing special services typically includes: a) a customer premises device at each endpoint of the circuit, which device is typically provided by the customer; b) a access channel to each endpoint typically provided by a local exchange carrier (LEC); c) central office equipment which supports the features of the special service, that equipment most often being located in a point of presence (POP) of a long distance carrier to provide both switching and conditioning facilities for the circuit and d) an interoffice transport facility which connects the POPs together.

Typically, each step in the prior art arrangements for provisioning a special service is an independent procedure performed by a separate system. In an exemplary prior art arrangement, a customer's request for a special service is received by a first system. Thereafter, another system checks if sufficient switching, conditioning and transport facilities, capable of being interconnected to provide the special service between the requested endpoints, appear to be available in an inventory of network facilities. In fact, some or all of the facilities appearing to be available are often not actually available. This is because configuring and implementing the requested special service, which is the next step in the process, is performed via human operations. Such operations result in poor records of the actual facility usage due, for example, to configuration implementation errors, failure to properly record facility usage, and delays in reposing on-the-spot substitution of different facilities for those originally designated to be employed. Once the special service is configured, it is tested, and, upon a successful test, its control is handed over, or delivered to, the customer. These prior art arrangements are slow and cumbersome. They also tend to fail, a large factor in such failure being the noted involvement of people in critical stages of the process.

Another problem with these prior art arrangements is that they are only able to employ available transport facilities at the particular level specified in the requirements for the special service, e.g., so-called DS0, DS1 or DS3. This requires the maintenance of an excessive inventory of transport facilities at each level, in order to meet present and future demands for special services at each level. Furthermore, should the special service provided fail at any point, separate restoration procedures are employed to restore operation of the special service as it was configured and delivered. This restoration process is often time consuming, depending upon the nature of the failure. Also, the customer is without the special service that failed for the lengthy duration of the failure.

SUMMARY OF THE INVENTION

The difficulties with prior art provisioning and restoring of special services in a network are overcome, in accordance with principles of the invention, by employing in the network a unified and automated system for providing, restoring and optimizing the special services that is continually aware of the state of all the equipment and facilities in the network. When a request for a special service is received, the unified system responds automatically to the request by 1) designing a circuit required to support the requested special service, 2) identifying network facilities and configurations for implementing the designed circuit, 3) assigning those facilities to the circuit, 4) causing the various equipment providing the facilities to be interconnected to implement the service, 5) verifying the integrity of the special service, and 6) delivering the service to the customer. In accordance with an aspect of the invention, if at any point in the process of providing a special service, it is determined that there are no available direct transport facilities in the inventory of network facilities at the level required to provide the special service between the particular points in the network that must be interconnected to provide the special service, the system will employ procedures for further identifying or developing transport facilities, in accordance with a predetermined hierarchical plan. The hierarchical plan includes: a) employing spare indirect transport facilities that are available on the same level as the sought transport facility, b) building the transport facility by employing transport facilities at the next higher level that directly connect the particular points or c) employing transport facilities at the next higher level that indirectly connect the particular points. The identified or developed transport facilities are delivered, as a unit, as a new inventory facility at the required level. In accordance with an aspect of the invention, if an indirect connection is used at any level, the new inventory unit is marked as a candidate for optimization to be performed in the future. Thereafter the process of providing the special service can proceed as previously described.

In accordance with another aspect of the invention, maintenance and restoration of special services can also be accomplished by employing the same unified system. When a failure in an already delivered special service is detected, a new special service can be automatically provided to replace the failed special service. As a further aspect of the invention, the unified system can achieve optimal employment of the network facilities. To this end, on a periodic basis, all the special services being provided in the network are examined and compared with the available network facilities so that any special services that are being provided suboptimally can be reprovisioned to achieve optimal use of the network.

BRIEF DESCRIPTION OF THE DRAWING

In the drawing:

FIGS. 7–12, when connected as shown in FIG. 6, form a flow diagram of the various processes employed for delivering, maintaining and restoring a special service, in accordance with the principles of the invention.

DETAILED DESCRIPTION

In this description, groups of similar elements having reference designations of the form XYZ-1, XYZ-2, XYZ-3 are also referred to collectively via the designation XYZ. For example, central offices 103-1 through 103-3 are collectively referred to as central offices 103.

Figure 1:
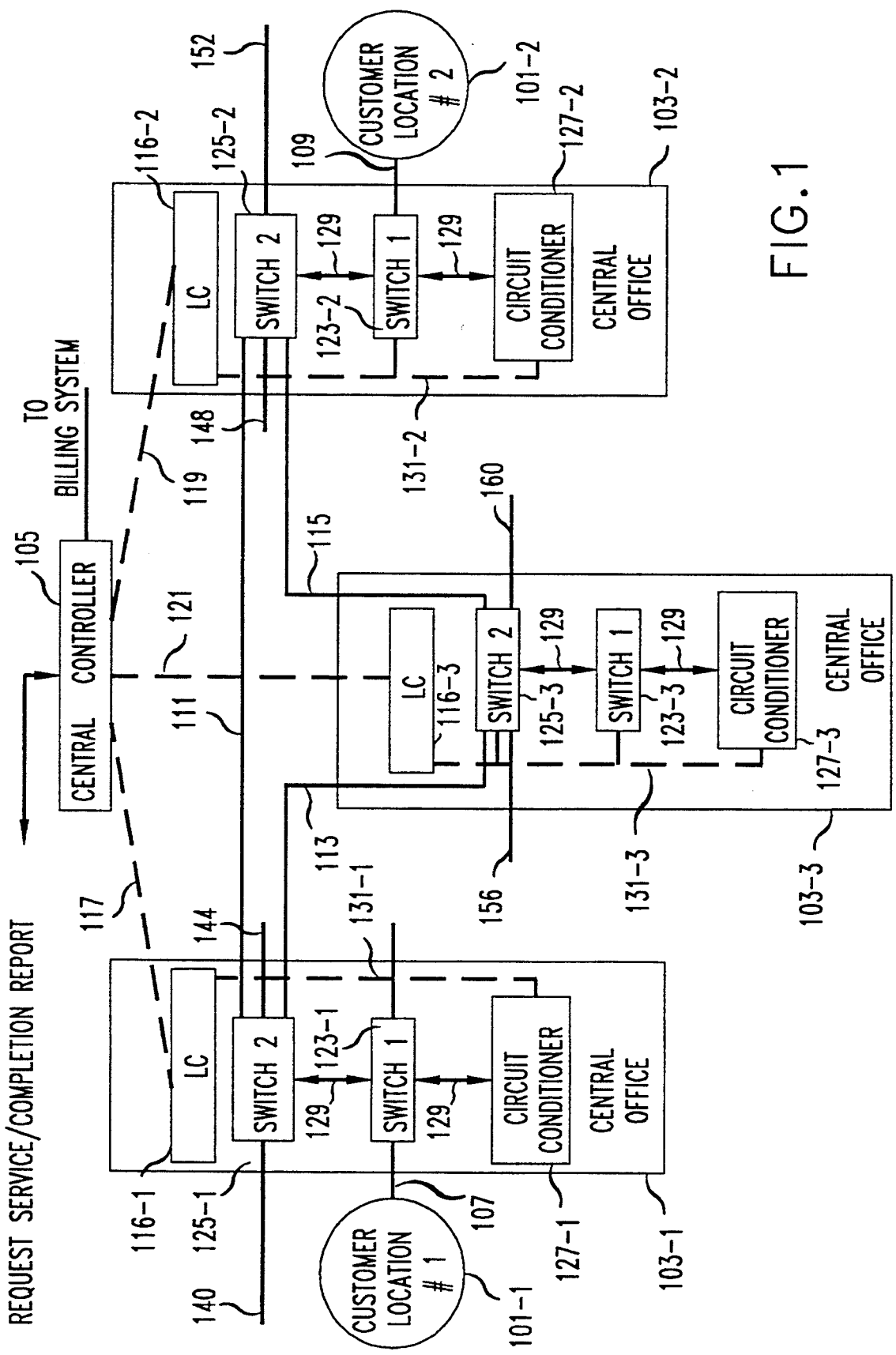
FIG. 1 shows an exemplary portion of a telecommunications network including customer locations, central offices and a central controller.

Shown in FIG. 1 is an exemplary portion of a telecommunications network, including: a) customer locations 101-1 and 101-2, b) central offices 103-1 through 103-3 and c) central controller 105. Access link 107 connects customer location 101-1 to central office 103-1 and access link 109 connects customer location 101-2 to central office 103-2. Also, transport facilities 111, 113, and 115 interconnect central offices 103-1 through 103-3, in the manner shown. Central offices 103-1 through 103-3 contain one of local controllers (LC) 116-1 through 116-3, respectively. Control links 117, 119 and 121 connect central controller 105 to local controllers (LC) 116-1, 116-2 and 116-3, respectively.

In addition to including one of local controllers 116, central offices 103-1 through 103-3 respectively include: a) first switches 123-1 through 123-3, b) second switches 125-1 through 125-3 and c)circuit conditioners 127-1 through 1273. The first and second switches in central offices 103-1 through 103-3 are interconnected by bidirectional intra-office links 129. Links 129 are functionally the same, since they are intra-office links carrying network traffic, and particularly, special services traffic. However, the capacities of each of links 129 need not be the same. Similarly, each of first switches 123 connects to its corresponding one of circuit conditioners 127 by one of bi-directional intra-office links 129. Transport facilities 111, 113 and 115 are links at the highest level of transport, e.g., DS3, and carry embedded therein lower levels of transport, e.g., DS0 and DS1.

The aforementioned transport facilities 111, 113 and 115 interconnect second switches 125. First switches 123 switch special services traffic at the lowest level and supply the switched traffic as outputs at the next higher level of the transmission hierarchy. Second switches 125 switch special services traffic at that next higher level and supply the switched traffic as output at the highest level of the transmission hierarchy. The manner in which the switches of a network are arranged into hierarchical levels, as well as how to perform any multiplexing and demultiplexing that may be required as special services traffic is transferred from one level to another, is well known. Transport facilities 140, 144, 148, 152, 156 and 160 carry special services traffic at the highest level to and from other central offices in the network that are not shown.

Each particular one of local controllers 116 is interconnected with the first switch 123, the second switch 125 and the circuit conditioners 127 that is contained within the same central office as itself. This interconnection is accomplished via data control links 131-1 through 131-3. As is well known to those skilled in the art, data control links 131 may be configured in any manner desired.

Figure 2:
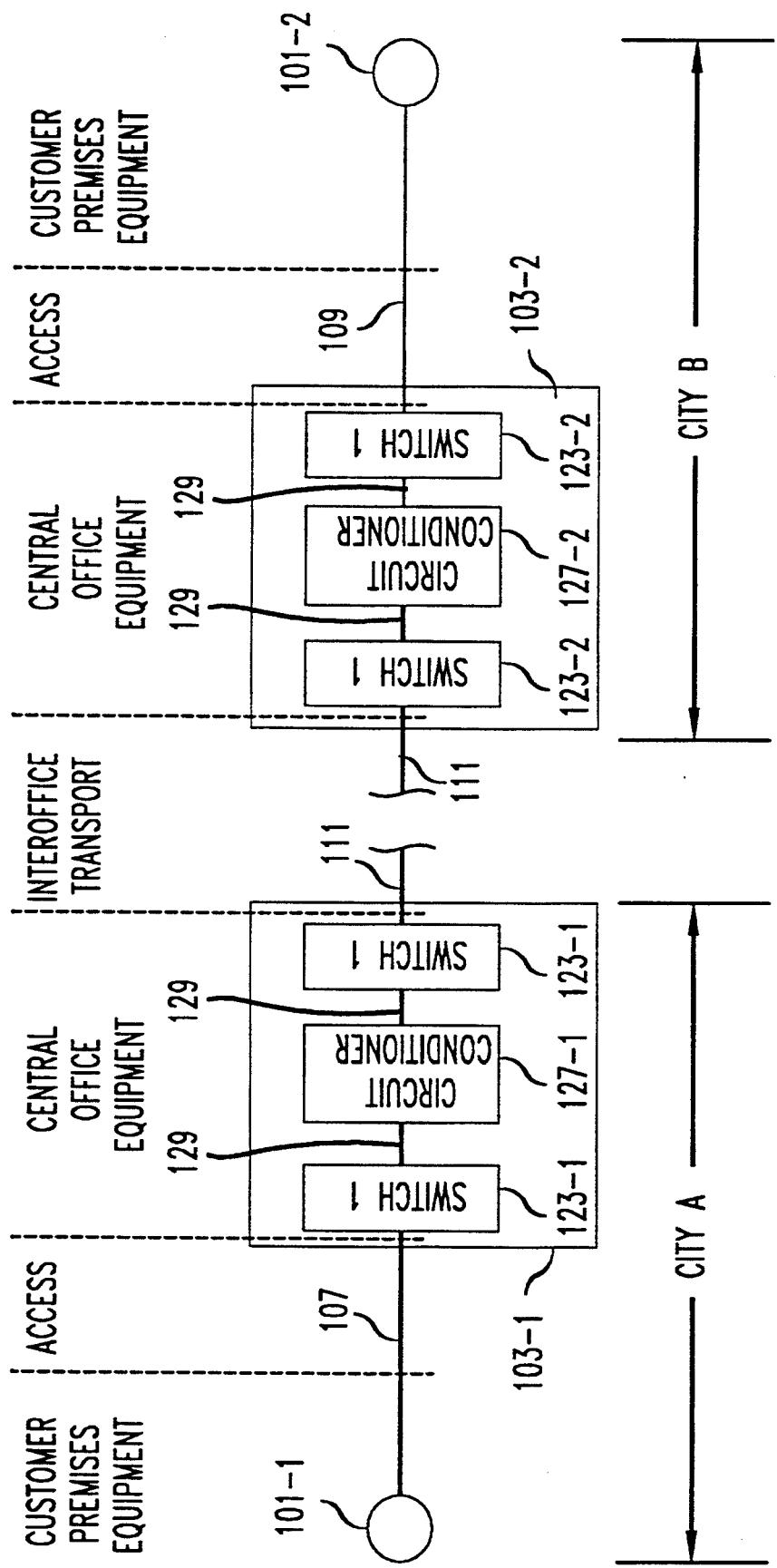
FIG. 2 shows a typical circuit for providing a special service requiring line conditioning, as it would be perceived by a customer.

FIG. 2 shows a customer's perception of a typical circuit for providing a special service that requires line conditioning. Line conditioning means giving the circuit being provisioned some special property such as signaling, echo control, etc. Access link 107 connects customer premises equipment at customer location 101-1 to central office 103-1. First switch 123-1 terminates access link 107 at a first port. The circuit then passes, via link 129, to an input of circuit conditioner 127-1. Thereafter, the circuit passes from an output of circuit conditioner 127-1 back to a second port of first switch 123-1 via link 129. Similarly, access link 109 connects customer premises equipment at customer location 101-2 to central office 103-2. The function of second switch 125 in providing the special service is not apparent from the customer's point of view. This is because second switches 125 serve only as vehicles for transporting the outputs of first switches 123. Transport facilities 111 connect central office 103-1 to central office 103-2.

Transport facilities 111 may actually be made up of a portion of a communication network (not shown). As such, facilities 111 may include communication equipment in several central offices (not shown) acting together. In fact, the internal structure of a communications network (not shown) that makes up transport facilities 111 may be arranged similar to that of the network shown in FIG. 1. If so, each transport facility 111 would appear to central offices 103-1 and 103-2 as a special service providing transport service as if those central offices themselves were special service customers. It is noted that regions city A and city B are shown for illustrative purposes only. The special service is not limited to being provided between separate cities.

Figure 3:
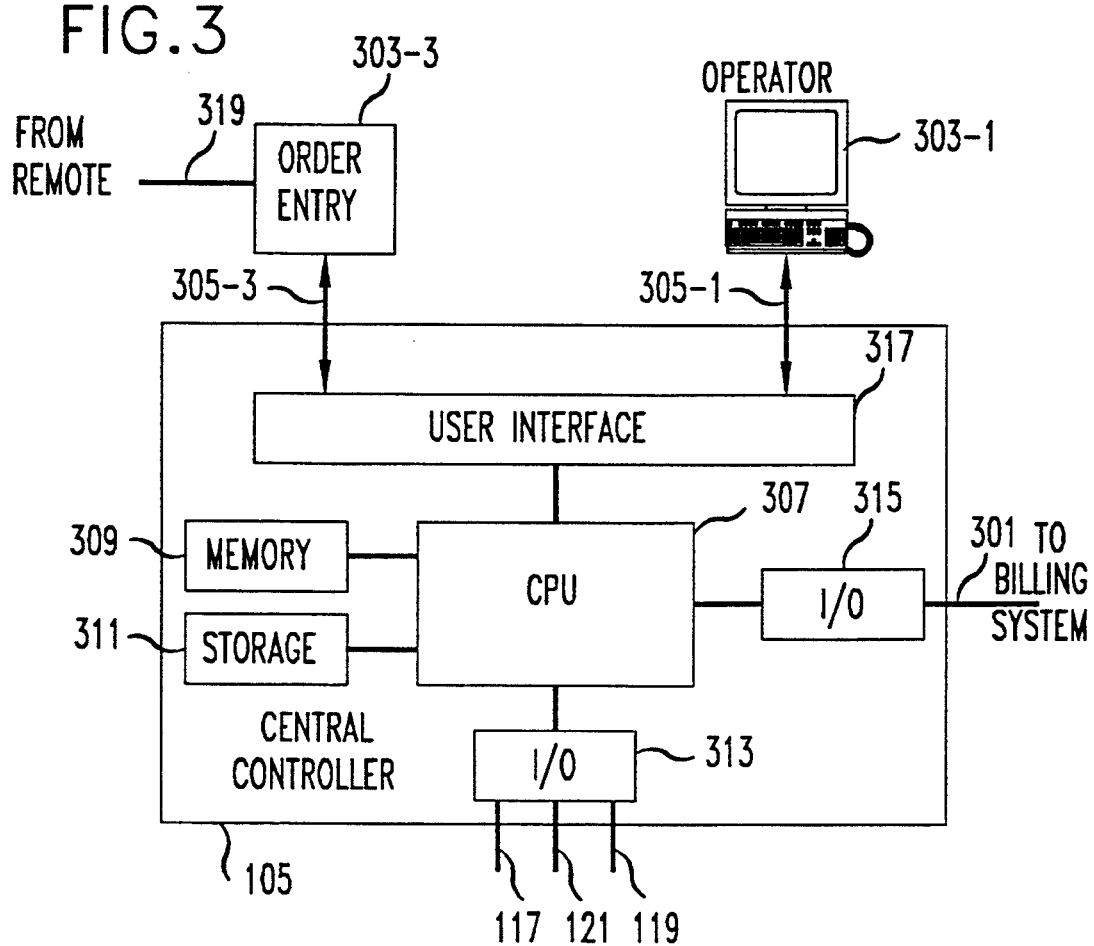
FIG. 3 shows, in simplified block diagram form, the structure of a central controller such as the one shown in FIG. 1.

Shown in FIG. 3, in simplified block diagram form, is an exemplary implementation of central controller 105. Central controller 105 is a digital computer with connections 1) to each of local controllers (LC) 116 via links 117, 119 and 121, 2) to a billing system (not shown) for billing customers for use of the special service via link 301 and 3) to external devices 303, via links 305-1 through 305-3. Central processing unit (CPU) 307 provides program-controlled processing for central controller 105. Memory 309, storage 311, input/output (I/O) 313, input/output (I/O) 315 and user interface 317 interface with central processing unit (CPU) 307. Memory 309 stores instructions and data for use by central processing unit (CPU) 307. Typically, memory 309 provides short term storage, typically RAM and ROM. Storage 311 retains data and instructions for the long term. Suitable for use as storage 311 are such well known storage systems as disk or tape units. Input/output (I/O) 313 provides a communications interface between central processing unit (CPU) 307 and local controllers 116 via links 117, 119, and 121. Input/output (I/O) 315 provides a communications interface between central processing unit (CPU) 307 and the above mentioned billing system, via link 301. Accurate information concerning service use and availability must be provided from central controller 105 to the billing system so that accurate bills are generated and sent to the customer.

User interface 317 interconnects central processing unit (CPU) 307 to external devices 303 via links 305 for communicating commands and information. Specifically, commands, such as a request to provision a special service, typically are received as an input from operator 303-1 or order entry system 303-3. Operator 303-1 is a terminal that typically includes a keyboard and video screen. Order entry system 303-3 is a computer for gathering order requests from remote locations via link 319. It supplies the order requests as inputs to central controller 105 in a batch mode, via link 305-3. User interface 317 also can supply information from central processing unit (CPU) 307 to external devices 303, via links 305. Such information includes the status of various special services being provided and exception reports indicating system problems.

Figure 4:
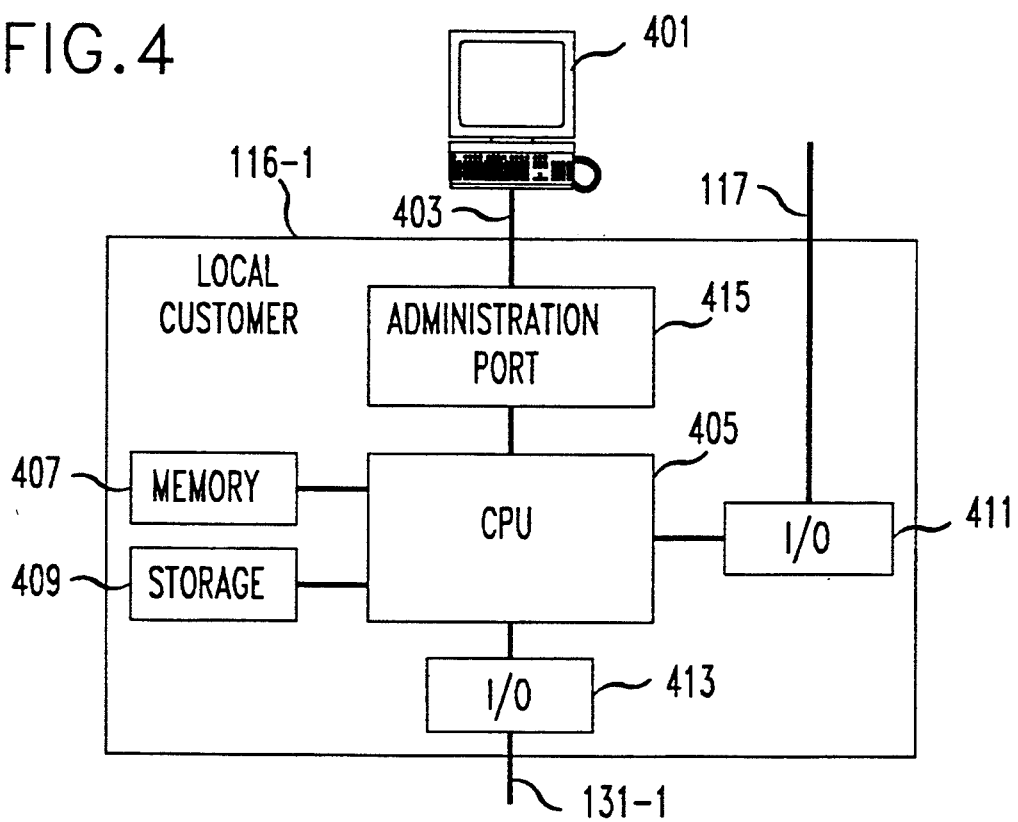
FIG. 4 shows, in simplified block diagram form, the structure of a local controller such as are included in the central offices of FIG. 1.

Shown in FIG. 4 is an exemplary implementation of local controller (LC) 116-1 (FIG. 1), in simplified block diagram form. The other local controllers (LC) 116 have the same structure. Similar in structure to central controller 105, local controller (LC) 116-1 is a digital computer with connections to 1) central controller 105 via link 117, 2) the network resources it controls via link 131 and 3) an optional administration console 401, via link 403. Central processing unit (CPU) 405 interfaces with a) memory 407, b) storage 409, c) input/output (I/O) 411, d) input/output (I/O) 413 and e) administration port 415. Memory 407 stores instructions and data for use by central processing unit (CPU) 405. Typically, memory 407 provides short term storage, typically RAM and ROM. Storage 409 retains data and instructions for the long term.

Input/output (I/O) 411 provides a communications interface between central processing unit (CPU) 405 and link 117 so as to provide connectivity for communications between central controller 105 and local controller (LC) 116-1. Input/output (I/O) 413 provides a communications interface between central processing unit (CPU) 405 and the network resources controlled by local controller (LC) 116-1, via links 131-1. Administration port 415 communicates information from central processing unit (CPU) 405 to optional administration console 401 via link 403. Such information includes commands and status about the various network resources controlled by local controller (LC) 116-1.

Figures 6, 13:
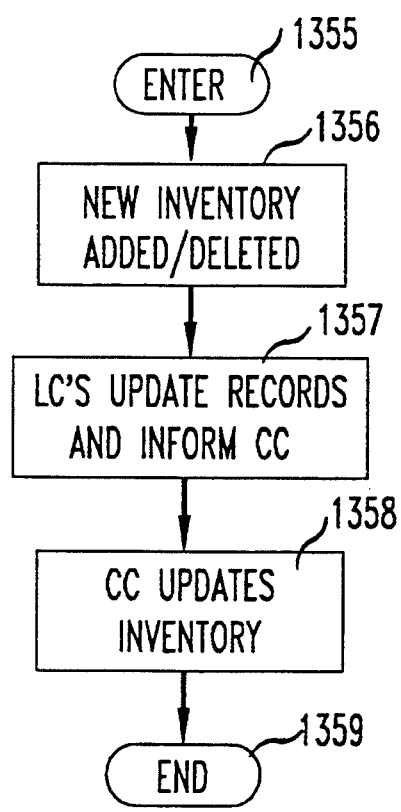
FIG. 13 shows, in flow chart form, a process that can be employed to add resources to or delete resources from the network inventory.
Figure 10:
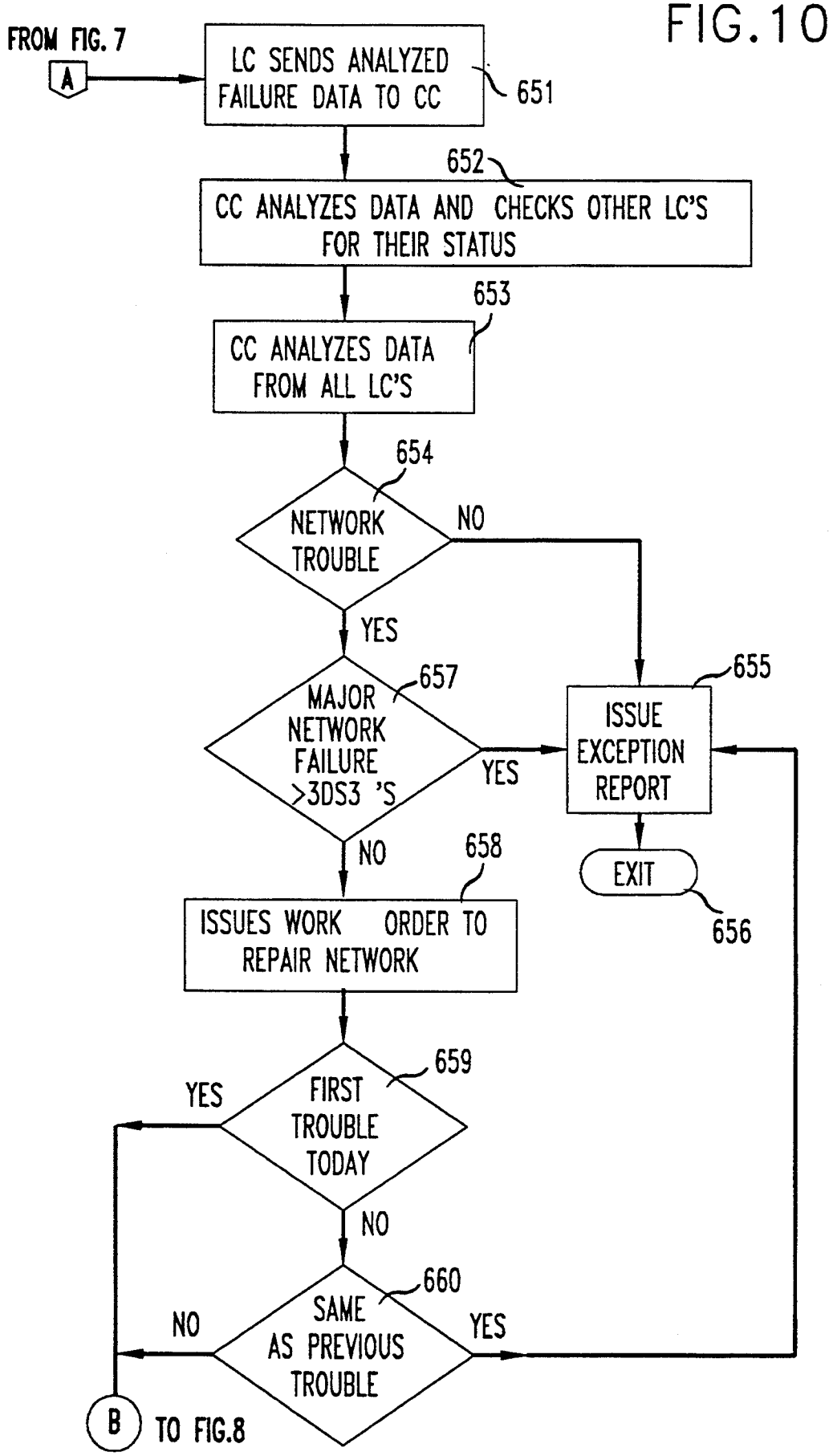
Figure 11:
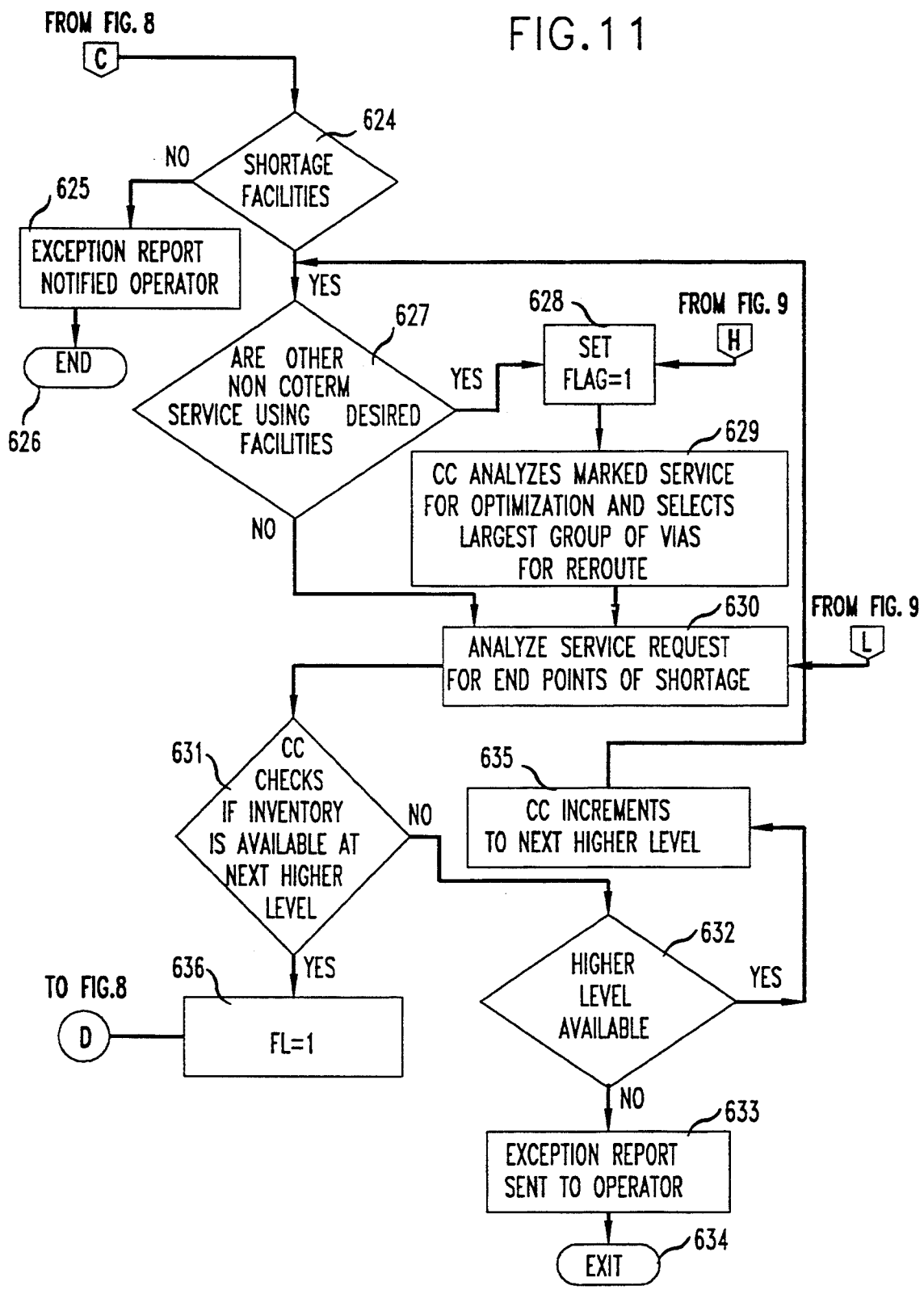

FIGS. 7-12, when connected as shown in FIG. 6, form a flow diagram of the various processes employed for delivering, maintaining and restoring a special service, in accordance with aspects of the invention. The initial provisioning of the special service begins when a customer request arrives at central controller 105 (FIG. 1). Accordingly, upon receipt of a request for a new special service, the routine begins in step 601 (FIG. 8). Operator 303-1 supplies such a request to central controller 105 via link 305-1. Alternatively, order entry 303-3 can supply a request via link 305-3. In step 602, central controller 105 initializes flags FL and FLAG to zero. These flags, as well as several others described later, serve as conditional indicators for controlling the flow of the process.

Next, in step 603 central controller (CC) 105 analyzes the special service request to extract its technical characteristics. Such technical characteristics can include: 1) echo canceling requirements, 2) signaling requirements, 3) bit rates, 4) bridging capability, and 5) equalization. Central controller 105 derives these technical characteristics from the requirements of the special service requested. The special services that may be requested typically include: a) ordinary point-to-point voice communications services, b) ordinary point-to-point data services (e.g. 4.8 kbit/sec), c) facsimile services, and d) high speed (45 Mbit/sec) data services. To derive the technical characteristics of an order request, central controller 105 compares the order request against a set of predetermined order request templates for which the technical characteristics have been specified. The technical characteristics employed are those retrieved from the template which matches the order request.

In accordance with an aspect of the invention, central controller 105 maintains a continuously updated inventory of resources available at each level of the transmission hierarchy of the network. To this end, central controller 105 knows what resources were initially available before the provisioning of any special services, what resources have been used to provision special services and which resources, if any, have failed and cannot be used. In step 604, central controller (CC) 105 checks if there is inventory available to meet each of the technical characteristics of the requested special service. To do so, central controller 105 checks if the list of resources required to provision the circuit, as determined from the technical characteristics, are available in the central offices along the path of the service.

As an example, provisioning a special service from customer location 101-1 (FIG. 1) to customer location 101-2 requires central controller 105 to determine the availability of the necessary conditioning resources in circuit conditioners 127-1 and 127-2. Also, needing to be ascertained is the availability of a path from first switch 123-1 to circuit conditioner 127-1, back to switch first 123-1, through switch 125-1 over link 111 to second switch 125-2, through second switch 125-2 to first switch 123-2, to circuit conditioner 127-2 and back to switch first 123-2.

Conditional branch point 605 tests to determine if the inventory that is available is sufficient to satisfy the technical characteristics of the requested special service. If the test result in step 605 is NO, indicating insufficient available inventory, control passes to step 620. The actions to take if there is insufficient available inventory are described further below. For ease of exposition, during this initial explanation, it is assumed that there is sufficient available inventory to provision and deliver the requested special service. It is also assumed that the optimization described below is not required at this point. Therefore, the test result in step 605 is YES and control passes to conditional branch point 606.

Conditional branch point 606 tests to determine if the special service endpoints are the same as the terminals of an existing transport facility, i.e., it determines if the special service requested is coterminating with a transport facility available in inventory. If the test result in step 606 is NO, additional steps are necessary. As a result, control passes to step 661. However, for purposes of this initial explanation, it is assumed that the special service is coterminating with a transport facility in inventory. Therefore, the test result in step 606 is YES and control passes to step 607. In step 607, central controller (CC) 105 assigns the required coterminating transport facility from the available inventory to the requested special service. Thereafter, control passes to step 608.

In step 608, central controller (CC) 105 forms appropriate orders for the each of local controllers (LC) 116 to achieve the required connections. There is a predetermined message-based protocol for transmitting orders between central controller (CC) 105 and local controllers (LC) 116. As pan of the orders, central controller (CC) 105 supplies any variables or information necessary to specify the actions by local controllers (LC) 116. In step 609, central controller (CC) 105 transmits the orders to each of local controllers (LC) 116 by way of links 117, 119 and 121. In step 610, each of local controllers (LC) 116 receives its respective orders. In step 611, each of local controllers (LC) 116 prepares orders for the network resources under its control and the orders are transmitted over respective ones of links 131. These orders effectuate the orders received from the central controller (CC) 105. Next, in step 612, switches 123 and 125, as well as circuit conditioners 127, make the connections specified in the orders.

For special services that do not require line conditioning, i.e., simple special services, the connections specified connect the input received from link 107, via first switch 123-1, to link 129, to second switch 125, which would switch the service onto an available path existing across link 111. Central office 103-2 establishes similar connections. A connection in second switch 125 switches the input from link 111 to link 129 and, from there, via a connection in first switch 123-2 onto link 109.

A special service requiring line conditioning might establish the following connections: a) link 107 to link 129 to circuit conditioner 127-1 via a connection in first switch 123-1; b) a connection through first switch 123-1 from circuit conditioner 127-1 to second switch 125-1 via links 129; c) a connection from link 129 to link 111 established in second switch 125-2; d) a connection from link 111 to first switch 123-2 in second switch 125-2, via link 129; e) in first switch 123-2, from second switch 125-2, to circuit conditioner 127-2, via link 129 and f) from circuit conditioner 127-2 to link 109, via link 129, in first switch 123-2.

Each of switches 123 and 125 and circuit conditioners 127 returns to its associated one of local controllers (LC) 116, via links 131, a report indicating the success or failure of each connection it was ordered to make. Each local controller (LC) 116 updates its records of resource use, which it maintains in its storage unit 409 (FIG. 4). In step 613, local controllers (LC) 116 inform central controller (CC) 105 that they have completed their orders. Thereafter, conditional branch point 614 tests to determine if FL is equal to zero. Since optimization is not being performed, FL is equal to zero and the test result in 614 is YES. Therefore, control passes to step 615. If the test result in 614 is NO, thereby indicating the performance of optimization, control would pass to step 638. This is described further below.

In step 615, central controller (CC) 105 notes the completion of the connections in its records, which it maintains in storage 311 (FIG. 3), and updates the record of the customer for whom the special service was provided. An exemplary customer record stores: 1) the customer's name and address, 2) special service type requested, 3) date installed and 4) a billing category. The special service order request is the source of this information. In step 616, central controller (CC) 105 verifies the connections making up the special service and that the special service, as delivered, meets or exceeds its performance requirements. Appropriate ones of local controllers (LC) 116 employ feedback loops in the equipment providing the network resources to perform verification tests. The local controllers (LC) 116 supply the results of their individual tests to central controller (CC) 105 via links 117, 119 and 121.

Conditional branch point 617 tests to determine whether the special service just delivered was in response to a request for a new special service. Since the current example is directed toward providing a new special service in response to a customer request, the test result in step 617 is YES. Therefore, control passes to step 618, in which central controller (CC) 105 sends a message to the billing system (not shown), via link 301 (FIG. 3), that the new special service has been brought into being. A predetermined protocol for communication exists between the billing system and central controller (CC) 105. Thereafter, the routine exits in step 619. If the test result in 617 was NO, indicating that a repair occurred, control passes to step 668. The portion of the process associated with repairs is described further below.

An inventory shortage of a resource on a direct path between the endpoints of a newly requested special service would arise if there were no available paths through link 111 to connect second switch 125-1 directly to second switch 125-2. In such a case, the method of the provisioning proceeds as follows. The routine is again entered via step 601 when the customer request arrives at central controller (CC) 105, and, steps 603 through 605 are performed as described above. However, because there is insufficient inventory to provide the requested special service, the test result in step 605 is NO. Control, therefore, passes to conditional branch point 620, in which central controller (CC) 105 tests to determine if the shortage in inventory is the result of insufficient capacity in circuit conditioners 127 (equipment). In this example, circuit conditioners 127 are required to properly condition the circuit providing the requested special service.

If the test result in step 620 is YES, control passes to conditional branch point 621 which tests to determine if a previously provisioned service uses the equipment as a "via". Vias are described further below. Such a service requires optimization. If the test result in step 621 is YES, the network, as a whole, may require optimization, as discussed below.

We assume here that the test result in step 621 is NO. This means that the network lacks the ability to directly add this special service. Therefore, in step 622, central controller (CC) 105 issues an exception report indicating that more switches and circuit conditioners are required. Installation of new switches and circuit conditioners is described further below. Central controller 105 terminates this request for a new special service and the routine is exited in step 623. Alternatively, the request could be placed in a pendant state and central controller 105 would wait for a signal that additional switches and circuit conditioners have been installed. Upon receipt of such a signal, central controller 105 would resume the processing of the request at step 605.

In an alternative exemplary embodiment, central controller 105 undertakes a search for an available one of circuit conditioners 127 in others of central offices 103 to which there exists an available path. Thereafter, a path from the one of circuit conditioners 127 to the ultimate destination of the service is also found. Such an implementation is similar to providing two separate special services that are joined. Each such service could be provisioned as provided below.

If the test result in step 620 is NO, then there is sufficient capacity in circuit conditioners 127 to provide the requested special service. Therefore, control passes to conditional branch point 624 (FIG. 11), which tests to determine if the shortage in inventory results from a shortage of transmission resources (facilities). Such resources include paths through the various switches and channels on transport facilities 111, 113 and 115. If the test result in step 624 is NO, it appears that both circuit conditioners and transmission resources are available. Contradictorily, an indication of insufficient inventory has been given. Therefore, control passes to step 625, in which central controller 105 issues an exception report to let an operator know of a network problem. Thereafter, the process exits in step 626.

If the test result in step 624 is YES, the inventory shortage is a result of a lack of transmission resources. Therefore, control passes to conditional branch point 627, which tests to determine if there are other non-coterminating special services using the desired facilities. If the test result in step 627 is YES, control passes to step 628 which sets FLAG equal to one (1). Control then passes to step 629. The test result for step 627 will be YES only if a previously provisioned special service requires optimization. For clarity, it continues to be assumed that optimization is not required. Therefore, the test result in step 627 is NO, and control directly passes to step 630. In step 630, central controller (CC) 105 determines the end points, bit rate and circuit conditioning needed to provide the requested special service. It also determines the same characteristics for the points along the path of the special service for which there is a shortage. In conditional branch point 631, central controller (CC) 105 checks the availability of inventory at the next higher level of the transmission hierarchy of the network. If the test result in step 631 is that inventory is not available, the test result is NO and control passes to step 632.

In accordance with an aspect of the invention, conditional branch point 632 tests to determine if there exists a level in the network hierarchy that is higher than the level just tried. If the test result in step 632 is NO, control passes to step 633, which generates an exception report that informs the operator of a system failure. Thereafter, the routine is exited in step 634. If the test result in step 632 is YES, control passes to step 635. In accordance with a principle of the invention, central controller (CC) 105 increments to the next higher level in step 635. Such incrementing is possible because central controller (CC) 105 knows the level of the original request and the hierarchical structure of the network. Control passes back to step 627 to test the available inventory at the new level.

If conditional branch point 631 determines that inventory is available at the next higher level between the points of the shortage, the test result in step 631 is YES. Therefore, control passes to step 636, which sets flag FL to one. Next, conditional branch point 637 tests to determine if FLAG equals zero (0). The test result is YES and control passes to step 608.

Operation proceeds as described above, from step 608 until conditional branch point 614, for the transmission of orders from central controller 105 to local controllers 116. However, instead of implementing the special service, these orders implement the building of facilities between the endpoints of the special service having the shortage. Building means the establishment of a transmission path for the service being requested from pre-existing network elements at the next higher hierarchical level. These facilities are built, in accordance with an aspect of the invention, at the level of the requested special service from those facilities at a level higher than that of the requested special service that were identified in step 631. In step 614 the test result is NO, and therefore, control passes to step 638, which resets flag FL to zero. Thereafter, control passes to step 639, which tests to determine if FLAG equals one. If the test result in step 639 is YES, control passes to step 665, which is pan of the optimization routine discussed further below. At this point, it continues to be assumed that optimization is not being performed. Therefore, the test result in step 639 is NO, and control passes to step 640, in which central controller (CC) 105 updates the available inventory. Control then passes back to step 605. In accordance with the principles of the invention, if there is now sufficient inventory available to provide the special service, operation will proceed as described above for providing a special service that has sufficient available inventory. If there still is insufficient inventory to provide the special service, operation again proceeds as described above for attempting to obtain additional inventory.

Local controllers 116 continually monitor the status of the facilities and equipment via links 131. Such monitoring, and methods for encoding the results thereof, are well known. At least one of local controllers 116 will automatically detect if a failure develops in a currently provided special service. Which ones of local controllers 116 actually detects the failure depends upon the nature of the failure. Only one of local controllers 116 may detect a localized failure in a resource in a single one of central offices 103. A disruption in a major link, e.g., link 111, may result in several of local controllers 116 detecting the failure.

In accordance with an aspect of the invention, special services for which a failure is detected are automatically reprovisioned by employing new, i.e., currently idle, equipment and facilities so as to quickly re-establish the special services. A technician can repair or replace the faulty equipment at a later time.

Upon detection of a facility or equipment failure by one of local controllers (LC) 116, the process of re-provisioning begins at step 641. In conditional branch point 642, the ones of local controllers (LC) 116 that detected the failure analyze it, in an attempt to determine if the cause of the failure is within resources under their control. Each of local controllers (LC) 116 receives status information from the equipment under its control, as well as from additional support equipment in its one of central offices 103, such as power supplies (not shown). The types of equipment available in a central office that would be monitored to determine a failure are well known by those skilled in the art. Each of local controllers (LC) 116 attempts to match its information with entries in a predetermined table of failures stored in storage 409. The finding of a matching entry indicates that the failure has occurred within resources controlled solely by the one of local controllers (LC) 116 finding the match.

If the test result in 642 is YES, indicating that the failure occurred within equipment that is under the sole control of the one of local controllers (LC) 116 detecting the failure, control passes to step 643. In step 643 the particular one of local controllers (LC) 116 analyzes the failed component and compares it with its available local inventory of resources. Conditional branch point 644 tests to determine if identical equipment, i.e., equipment capable of providing the same functionality as the equipment that failed, is available in inventory. If the test result in step 644 is NO, control passes to step 645, which issues an exception report to the operator. This exception report indicates that the problem detected is beyond the ability of the system to handle by itself and requires the intervention of a human operator to analyze and correct the trouble condition. Thereafter, the process is exited in step 646.

If the test result in step 644 is YES, control passes to step 647, in which the particular one of local controllers (LC) 116 sends an order to its controlled equipment to replace the failed resource with the identified identical resources. Thereafter, control passes to step 648, in which the particular one of local controllers (LC) 116 updates the available inventory under its control. In step 648, one of local controllers (LC) 116 sends a message to central controller (CC) 105 to update the inventory in storage 311 (FIG. 3), in accordance with an aspect of the invention. In step 649, central controller (CC) 105 receives the message and updates its inventory. In addition, central controller (CC) 105 prepares a work order so that a technician will be dispatched to repair or replace the failed equipment. The newly repaired or replaced equipment can be returned to inventory by a process described below for installing new equipment. The process is then exited in step 650.

If the test result in step 642 is NO, indicating that the failure detected occurred in equipment that is not under the sole control of the particular one of local controllers (LC) 116 detecting the failure, control is passed to step 651. In step 651, the particular one of local controllers (LC) 116 which has detected the failure sends its analyzed failure data to central controller (CC) 105. Next, in step 652, central controller (CC) 105 itself analyzes the data received from the particular one of local controllers (LC) 116. It also checks the status of each of the other local controllers (LC) 116, in turn. In step 653, central controller (CC) 105 analyzes status data from all of local controllers (LC) 116.

Central controller (CC) 105 tests to determine, in conditional branch point 654, if network trouble exists. Network trouble is a failure that affects more than one central office, such as a failure of an interoffice transport link, e.g., link 111. If the test result in 654 is NO, an exception report is issued in step 655. This exception report indicates that the problem detected is beyond the ability of the system to handle by itself. This is because a failure not under the control of a single one of local controllers (LC) 116, as was indicated by the negative test result in step 642, must be a network failure. However, if the negative test result in step 654 does not indicate a network failure, there is a contradiction. Such a contradiction indicates that the failure is beyond the ability of the automatic system to handle and requires the intervention of a human operator. Thereafter, the process is exited in step 656.

If the test result in 654 is YES, control passes to conditional branch point 657, which tests to determine if a major network failure has been detected. One definition of a major network failure is the failure of more than three of the highest level transport facilities, e.g., DS3 level. If the test result in 657 is YES, control passes to step 655, in which an exception report, indicating a major network failure, is issued. If the test result in 657 is NO, indicating that the failure is not a major network failure, control passes to step 658.

In step 658 central controller (CC) 105 issues a work order to replace or repair the equipment causing the network trouble which was identified by the analysis performed by central controller (CC) 105. Additionally, central controller (CC) 105 marks the equipment causing the network trouble as unavailable in inventory. Conditional branch point 659 tests to determine if this is the first time on this particular day that trouble has been reported on this particular special service. If the test result in step 659 is YES, control is passed to step 603. This causes provisioning of a new special service that is identical to the special service experiencing the failure. If the test result in step 659 is NO, control passes to conditional branch point 660, which tests to determine if the trouble reported is the same as a previously reported trouble. If the test result in step 660 is YES, the automatic restoration routine has previously attempted to restore this particular type of failure and has proven unsuccessful. Therefore, an exception report is generated in step 655. Thereafter, the process is exited in step 656. If the test result in step 660 is NO, control is passed to step 603. Again, this causes provisioning of a new special service that is identical to the special service experiencing the failure.

Provisioning of the replacement special service, initiated in step 603, proceeds in the same manner described above for a new special service, until step 617. Conditional branch point 617 tests to determine if a new special service is being provisioned. The test result in step 617 is NO, because a previously provided special service is being reprovisioned. Control, therefore, passes to step 668, which informs the operator of the repair of the special service. In step 669, the customer trouble history records are updated. Storage 311 (FIG. 3) stores the customer trouble history records. The routine is then exited in step 619.

An efficient implementation of a special service is defined to be a provisioning of the service such that it passes over a direct connection between the ones of central offices 103 which are attached to its endpoints. When a special service is being provisioned or reprovisioned, there may be sufficient inventory to provision the special service. However, the special service circuit, as provisioned from the available inventory, may be an inefficient implementation. Such inefficient implementations occur when the necessary transport facilities, which directly connect the two of central offices 103 that are endpoints of the special service, are already employed by other special services. Such other special services may employ the facilities as part of efficient implementations of such services or as a via to provide connectivity with some other ones of central offices 103. Inefficient implementations also occur when there is not enough demand for special services between the particular endpoints to justify a direct transport facility between them.

Figure 5:
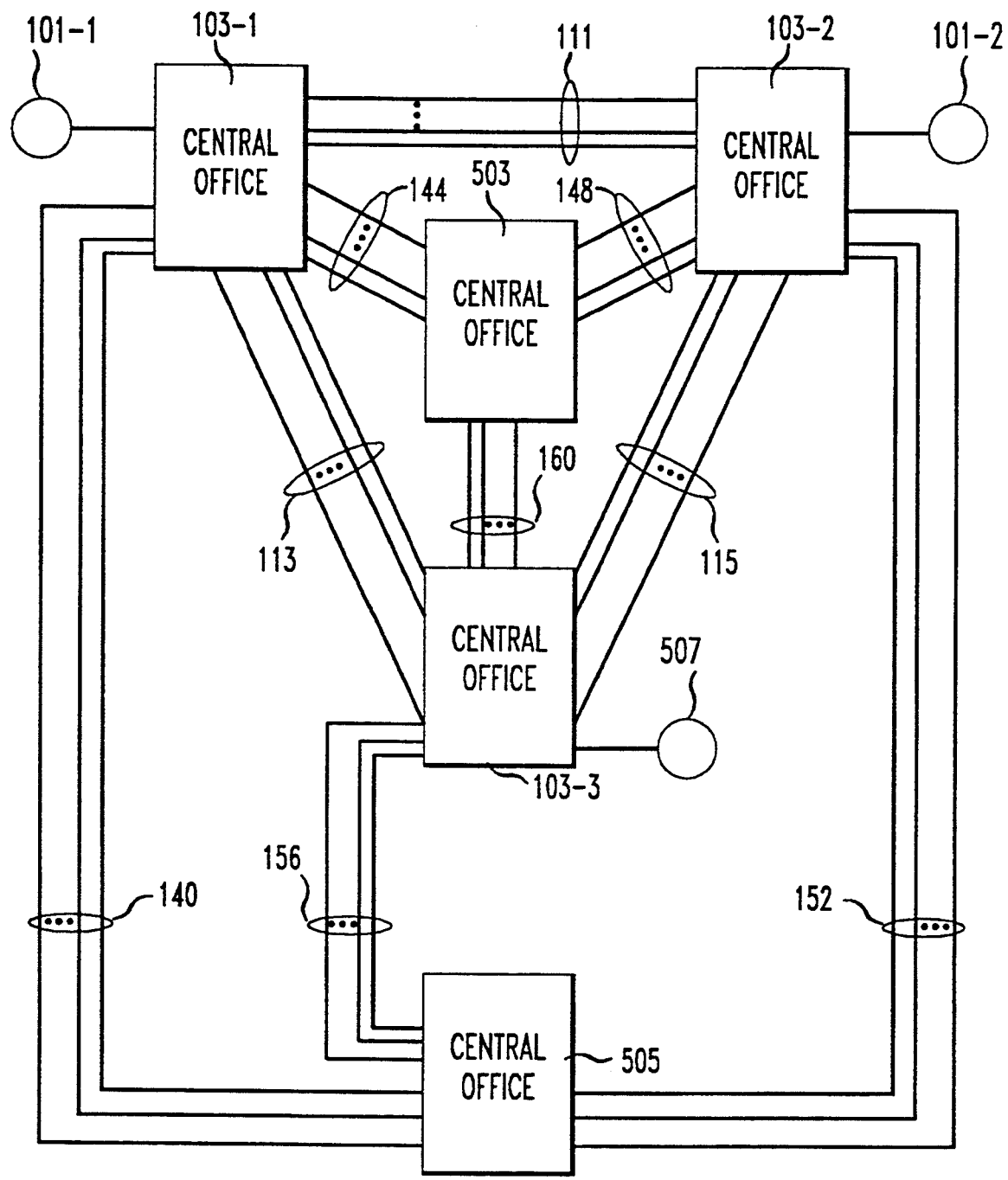
FIG. 5 shows an alternate representation of the network as shown in FIG. 1 connected to several additional central offices.

As an example, FIG. 5 shows the same portion of the network shown in FIG. 1, and, additionally, it shows that portion of the network connected to central offices 503 and 505. For purposes of illustration, it is assumed that only one type of special service circuit can be provisioned and that this circuit requires a single DS1 channel. Therefore, all the DS1 level transport resources of transport facilities 111, 113, 115, 140, 144, 148, 152, 156 and 160 are shown broken out at the DS1 level.

For a new special service that interconnects customer locations 101-1 and 101-2, an efficient implementation would be one which employs a DS1 channel on transport facility 111 that directly for the interconnects central offices 103-1 and 103-2. However, suppose all the DS1 channels on transport facility 111 are already employed by other, already provisioned and implemented, special services. If so, the new special service can not be implemented efficiently because there is no direct connection between the ones of central offices 103 attached to its endpoints. However, there may be available an indirect connection, e.g., by way of transport facility 113, central office 103-3 and transport facility 115. If so, and the special service is so provisioned, the resources of transport facility 113 and transport facility 115 so employed are said to be used as "vias". A special service circuit that is implemented over a special service circuit employing vias is an inefficient implementation. Furthermore, the more vias that are employed in a special service circuit the less efficient the implementation is.

If a special service connecting customer locations 101-1 and 507 is requested, those resources that have been used for efficient implementations between central offices 103-1 and 103-3, or as vias for special services that do not have as their terminating central offices central offices 103-1 and 103-3, are not available in inventory. As a result, it is possible that there are no resources between central offices 103-1 and 103-3 and the service will have to be implemented inefficiently, perhaps by way of using transport facilities 115 and 111 as vias. However, if a special service using transport facility 113 as a via could be rerouted so that it no longer employ transport facility 113, even if the service as rerouted still employed vias, an efficient implementation of the special service between customer location 101-1 and 507 would be possible. Thus, the special service between customer location 101-1 and 507 could be "optimized", i.e., transformed from an inefficient/less efficient implementation to an efficient/more efficient implementation, if the resources necessary to do so become available.

During the provisioning or repair process, if the test result in step 606 is NO, step 661 is reached because inventory is available but that inventory is not coterminating with the service that is being provisioned. In accordance with an aspect of the invention, step 661 tests to determine if a transport link that establishes a direct link between the endpoints of the requested special service exists but is employed by a previously provisioned special service that has endpoints which are not the same as those of the requested special service. In other words, step 661 tests if there exists a transport link that would have allowed the special service being provisioned to be implemented efficiently but that transport facility is in use and, therefore, unavailable. If the test result in step 661 is NO, control passes to step 662, which tests to determine if creating a new direct path is now justified, in accordance with an aspect of the invention. A direct path is justified when the total of the number of special services previously marked for optimization and the new special service exceeds a predetermined threshold.

If the test result in step 662 is YES, control passes to step 630 and central controller (CC) 105 analyzes the end points of the special service for construction of new facilities between the end points. The analysis is the same one performed if there was a shortage of inventory between the end points. In accordance with an aspect of the invention, central controller (CC) 105 tests for inventory availability at the next level, in step 631. Thereafter, operation continues as described above for obtaining inventory from a higher level. If the test result in step 662 is NO, control passes to step 663, which marks the special service for future optimization, in accordance with an aspect of the invention. Thus, the special service will be implemented, but in an inefficient manner. Future optimization will be discussed below in association with reprovisioning routing that is started by an operator.

If the test result in step 661 is YES, control passes to conditional branch point 664, which tests to determine if the threshold to build new transport facilities has been reached. This threshold is predetermined and set by the network operator. The threshold typically reflects current usage of network resources as well as an estimate of costs for new resources. It is based on the well known idea that the future needs of transport facilities are best predicted by past needs. The threshold for each pair of endpoints may be implemented individualized, so that each pair of endpoints to has its own threshold.

In one embodiment, endpoints interconnected by a large number of special service circuits would tend to have a threshold that will cause new facilities to be built at an earlier time than endpoints interconnected by a small number of special service circuits. Setting the thresholds, to ensure efficient utilization of network resources is left to the network operator. Storage 311 (FIG. 3) stores the thresholds. It is recommended that the thresholds not be set to zero (0).

If the test result in step 664 is NO, control passes to step 663. Therein, central controller 105 marks the special service for future optimization, in accordance with an aspect of the invention. Again, future optimization will be discussed below.

If the test result in step 664 is YES, the threshold to build a new facility between the endpoints of the service to be provisioned has been reached. Therefore, control passes to step 628 in which FLAG is set to 1. In accordance with an aspect of the invention, reaching the threshold causes the building of a direct facility at the level of the special service from the inventory available at a higher level for use in provisioning the special service. Therefore, control passes to step 629.

In step 629, central controller (CC) 105 analyzes the services marked for optimization and selects the largest group of vias to be rerouted. To this end, central controller (CC) 105 reviews those services that employ as a via any facility that directly connects the endpoints to be connected for the service being provisioned. Such services were previously marked in step 663 when they were provisioned. Central controller (CC) 105 selects a subset of such services having common endpoints. In step 630 central controller (CC) 105 analyses the end points of the selected subset of services to see if construction of new facilities at the next level between the endpoints of the selected subset is justified. Thereafter, the process proceeds as described above, until it reaches conditional branch point 639, but the orders cause the building of the new facilities instead of the provisioning of a special service. Now, the value of FLAG is one, so that the test result is YES, and control passes to step 665.

In step 665, central controller (CC) 105 moves the marked subset of services to the now available direct path using the procedures described in reprovisioning below. Upon completion of rerouting, control passes to step 666, in which central controller (CC) 105 and local controllers (LC) 116 update their respective inventories. Central controller (CC) 105 sets FLAG to zero (0) in step 667. Control then passes to step 605 and the provisioning process for the requested special service proceeds as described above.

An operator who receives a report of a failure in a special service can manually initiate the reprovisioning process. This causes an attempt to fix the failure by replacing the entire special service as provisioned with a reprovisioned alternate version of the same special service that employs different facilities and equipment. The reprovisioning process is entered via step 670. In step 671, all facilities and equipment used to provide the special service are marked as unavailable in inventory and messages are sent by central controller 105 to local controllers 116 to release those facilities and equipment. Thereafter, control passes to step 652 and the process continues as described above for a failure in a special service that has been automatically detected.

In the event of a major network failure, defined above as the failure of 3 or more of the highest level transport facilities, the test result in step 657 is YES and an exception report is issued in step 655. Thereafter, the process is exited in step 656. The handling of major network failures is beyond the scope of this application.

Shown in FIG. 13, in flow chart form, is a process for use in adding resources to or delete resources from the network inventory. As noted, such changes in network inventory provide new network capabilities, increase network capacities, or to return repaired facilities to service. The process is entered via step 1355, when network resources must be added or deleted. The new resources are physically added or deleted from the network in step 1356. This may involve actual physical installation, such as the manual installation of transport facilities, switching equipment and conditioning equipment. In addition, such physical changes may be implemented by populating the network's already installed equipment with additional or different circuit packs. Also, equipment and circuit packs may be removed from the network entirely. Typically, technicians perform such physical installations. In addition, activation and testing for compliance with requirements of such newly installed equipment would be performed under the control of each of local controllers (LC) 116 in the central office in which such new equipment is installed.

Thereafter, in step 1357 each of local controllers (LC) 116 updates and records in its records the successful addition or deletion of the inventory. Also each of local controllers (LC) 116 and transmits status information to central controller (CC) 105 to reflect its current inventory of available resources. Central controller (CC) 105 updates its own inventory records in step 1358. Thereafter, the routine is entered via 1359.

The foregoing merely illustrates the principles of the inventions. It will thus be appreciated that those skilled in the art will be able to devise various arrangements which, although not explicitly described or shown herein, embody the principles of the invention and are thus within its spirit and scope.

What is claimed is:

1. A method for use in automatically provisioning communication special services between locations in a network that has predetermined network facilities, the method comprising the steps of:

receiving requirements for a particular customer-specified special service, said customer-specified special service being a dedicated communication capability selected from a plurality of predefined special service types that is provided through said network for the exclusive use of said customer;

monitoring on an ongoing basis an immediate availability status for each facility in said network and developing in response thereto an inventory that lists facilities of said network that are immediately available to be interconnected to provide special services;

analyzing said requirements for said particular special service to extract its technical characteristics;

identifying a set of facilities having said technical characteristics that are to be employed in providing said particular special service from facilities that are listed in said inventory; and generating control signals to cause said facilities of said set to be interconnected to provide said particular special service.

2. The invention as defined in claim 1 including the further steps of:

changing the availability status of each facility of said set to unavailable;

associating said particular special service requirements and said set; and storing in a memory an indication of said particular special service requirements in association with said set.

3. The invention as defined in claim 1 including the further step of: making said particular special service available to a customer.

4. The invention as defined in claim 1 wherein each of said facilities in said inventory belongs to a particular level of a plurality of predetermined successive levels of a transmission hierarchy, each special service type of said a plurality of special service types belongs to a particular one of said levels and each facility identified to said set in said step of identifying is only so identified if it belongs to the same particular level as the type of special service specified by said particular special service requirements.

5. The invention as defined in claim 4 wherein said step of identifying includes the steps of:

determining the characteristics of facilities at said particular level that are necessary to provide said particular special service but are unavailable because insufficient facilities to provide said particular special service at said particular level are listed in said inventory;

building facilities having said characteristics at said particular level from facilities listed in said inventory at a higher level than said particular level.

6. The invention as defined in claim 5 wherein said steps of determining and building are repeatedly performed by employing levels that are successively higher than said particular level until the facilities having said characteristics at said particular level are built or there are no higher levels in said plurality of levels.

7. The invention as defined in claim 1 wherein said particular special service requirements specify at least i) the type of special service from among said plurality of predetermined special service types and ii) endpoint locations for said particular special service.

8. The invention as defined in claim 7 wherein said step of identifying includes the steps of:
   determining the characteristics of each facility that is necessary to provide said particular special service along a most direct route between said specified endpoint locations but are not listed as available in said inventory; and
   building indirect facilities having said characteristics by combining facilities listed in said inventory.

9. The invention as defined in claim 7 wherein said step of identifying includes the step of determining if any facilities of said set are not along a most direct route through said network for said particular special service between said specified endpoint locations and said method includes the further step of marking said particular special service for future optimization if it is determined that facilities not along said most direct route have been identified as part of said set.

10. The invention as defined in claim 9 including the further steps of:
    for each special service that was marked for future optimization, determining if a new set of facilities can be identified from i) those facilities listed as available inventory and ii) those facilities currently providing the special service such that said new set of facilities has more facilities along the most direct route through said network between said specified endpoint locations for said particular special service than the current set;
    immediately reserving the facilities of such a set for each special service for which a new set of facilities is so identified by marking all facilities in such sets unavailable for any other special service;
    scheduling a time to reroute each special service for which a new set of facilities is identified from the facilities of the set which currently provide each such special service onto the newly identified facilities in said new set of facilities; and
    rerouting each of said special services for which a new set of facilities is identified from their respective current facilities to the facilities in their respective reserved facility sets at a scheduled time whereby the current facilities become listed as available inventory.

11. The invention as defined in claim 1 including the further steps of:
    making a determination, for each facility in said set, if the number of facilities in said inventory that directly interconnects the pair of locations interconnected by said facility is equal to a predetermined threshold; and
    building a predetermined number of additional facilities at the level of said facility that directly interconnects said pair of locations for each facility of said set that said determination was YES.

12. The invention as defined in claim 2 further including the step of:
    identifying special services that have failed;
    retrieving said indication of said particular special service requirements and said associated set;
    supplying requirements indicated by said indication for reception in said step of receiving; and
    repeating said receiving, identifying and generating steps.

13. A system for use in automatically provisioning customer-specified communication special services, which are dedicated communications capabilities selected from a plurality of predefined special service types that are provided for the exclusive use of said customer, in a network that has predetermined network resources, each of said resources belonging to a particular level of a predetermined plurality of levels of a transmission hierarchy and each of said special services being provided over a special service circuit made up of said resources and also belonging to a level from said predetermined plurality of levels, said system comprising:
    means for making a determination if a special service circuit can be provisioned from network resources that are currently listed in an inventory of network resources that are available at the level of said special service circuit, said means for making a determination being responsive to at least both i) the network resources listed in said inventory and ii) the resources required to make up the special service circuit, an identification of said resources required having been derived in response to a request for a special service that specifies requirements which are particular to said special service, said determination being such that said special service circuit can be provisioned only if there is listed in said inventory sufficient network resources to meet said requirements of said special service request;
    means, responsive to said determination, for adding to said inventory additional resources at said level of said special service circuit if the available network resources in said inventory are insufficient to support said special service circuit, said additional resources being obtained from a level higher than said level; and
    means for controlling and sequencing the operations of said means for making and said means for adding until sufficient inventory to provision said special service is available at said level or no further resources are available at any level higher than said level.

14. The invention as described in claim 13 including:
    means for deriving the resources required by a special service circuit from a request for a special service that specifies requirements which are particular to said special service, the output of said means for deriving for use by said means for making a determination.

15. The invention as described in claim 14 wherein said means for deriving includes:
    means for receiving requests for special services to be provisioned or restored;
    means for designing a special service circuit to support special service requests received by said means for receiving; and
    means for ascertaining the types of resources that are required, but not necessarily available in said inventory, to implement said special service circuit as designed.

16. The invention as described in claim 15 wherein said means for designing includes:
    means for comparing received special service requests against templates of special services until a matching template is found; and means for retrieving special service circuits associated with said matching template.

17. The invention as described in claim 15 further including means for assigning one of each type of ascertained network resources from those resources listed in said inventory to said special service circuit if said determination is that sufficient inventory to provide the type of special service circuit is available at said level.

18. The invention as described in claim 13 wherein said additional resources are obtained from resources which are available in at least one inventory of resources that lists resources that are at a higher one of said predetermined plurality of levels than said level.

19. The invention as described in claim 13 wherein said additional resources are constructed from at least two resources which are available in the said inventory and which when interconnected form the required resource.

20. The invention as described in claim 13 wherein said additional resources are constructed from at least two resources which are available in the same at least one inventory of resources that lists resources that are at a higher one of said predetermined plurality of levels than said level and which, when interconnected, form a resource at said higher level from which a resource at said level may be obtained.

21. The invention as described in claim 19 further including means for marking a special service circuit that employs at least one such additional resource as a candidate for optimization.

22. The invention as described in claim 20 further including means for marking a special service circuit that employs at least one such additional resource as a candidate for optimization.

23. The invention as described in claim 13 further including:
   means for determining if a special service circuit supporting a special service has failed;
   means for marking at least one resource of a special service circuit as unavailable if it is determined that said resource belongs to a special service circuit supporting a special service that has failed;
   means for returning all unmarked resources of said special service circuit to the inventory of network resources at the level of said special service; and
   means for restarting said means for making a determination and said means for adding so as to reprovision said special service circuit.

24. In a communications network having predetermined network resources, each of said network resources being assigned to a particular one of a plurality of predetermined levels of a transmission hierarchy, a system for automatically provisioning or restoring communication special services comprising:
   means for receiving special service requirements and ascertaining a type of special service required, said required special service being a customer-specified dedicated communication capability selected from a plurality of predefined special service types that is provided through said network for the exclusive use of said customer;
   means responsive to said ascertained type of special service for designing a special service circuit employing said network resources that will support said ascertained type of special service;
   means, responsive to i) actual immediate usage of said network resources and ii) said special service circuit, for determining which of said network resources are to be assigned to said special service circuit if there are sufficient network resources available in an inventory of network resources at the level of said special service circuit;
   means for obtaining new inventory at said level of said special service circuit from available inventory at levels of inventory higher than said level if said means for determining determines that said available network resources in said inventory at of network resources at said level are insufficient to support said special service circuit;
   means for controlling and sequencing the operations of said means for determining and said means for obtaining until sufficient inventory to provide said ascertained type of special service is available at said level or no further inventory is available at any level; and
   means for assigning said determined network resources to said special service circuit if sufficient inventory to provide said special service circuit is available at said level.

25. The system as defined in claim 24 further including:
   means for making said special service circuit available to a customer.

26. The system as defined in claim 25 further including:
   means for determining if said special service circuit is operating within parameters defined for the type of special service that said special service circuit supports;
   means for placing said special service circuit in an active state if it is determined that said type of special service is operating within said parameters;
   means for placing said special service circuit in a failed state and removing any failed network resources from said inventory of network resources if said special service circuit is not operating within said parameters; and
   means responsive to said received special service requirements for causing said system for automatically provisioning to reprovision said special service circuit if said special service circuit was placed in a failed state.

27. In a communications network having predetermined network resources, each of which is assigned to a particular one of a plurality of predetermined levels of a transmission hierarchy, a method for automatically optimizing communication special services including the steps of:
   a. determining a type of special service required, said required special service being a customer-specified dedicated communication capability selected from a plurality of predefined special service types that is provided through said network for the exclusive use of said customer;
   b. if said type of special service is being provided by a special service circuit that is not optimum, determining if a new special service circuit can be designed from available inventory that can support said type of special service and is closer to optimum than the current special service circuit;
   c. if a new circuit that is closer to optimum can be designed from available inventory, reserving those of said network resources that are needed to implement the new circuit such that the new circuit is as close to optimum as can be obtained with the resources in said inventory;
   d. scheduling a time for special service reroute such that a minimal impact on the special service provided will result;
   e. rerouting from the old special service circuit to the new special service circuit.

* * * * *